July 23, 1935.  J. R. LEE  2,008,670
SPRING CUSHION
Filed Aug. 12, 1933  2 Sheets-Sheet 1
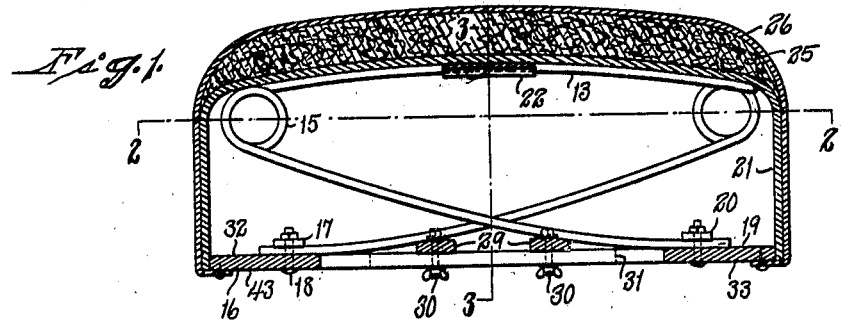
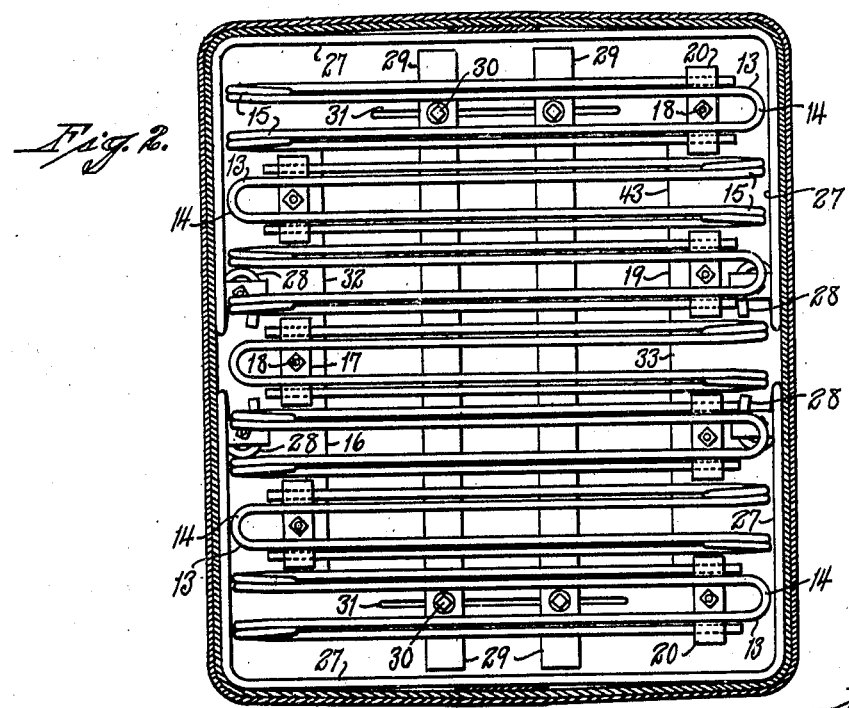
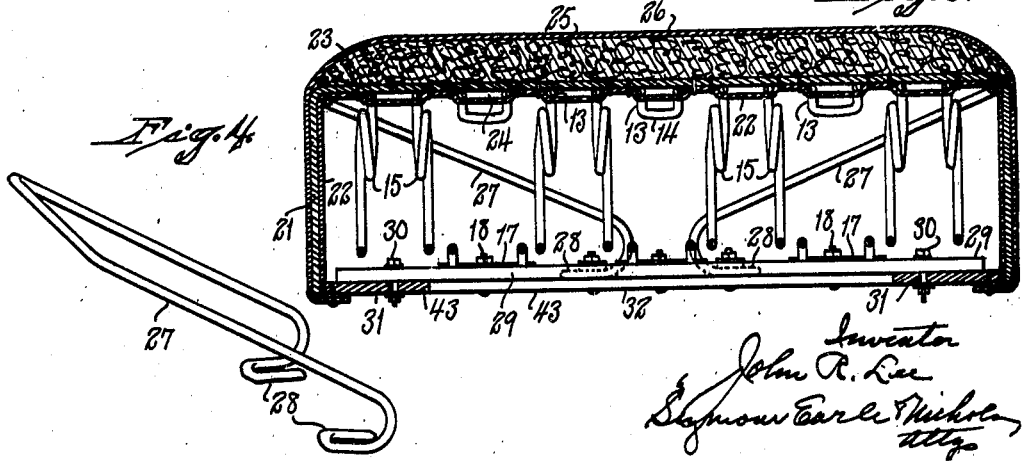

July 23, 1935.    J. R. LEE    2,008,670
SPRING CUSHION
Filed Aug. 12, 1933    2 Sheets-Sheet 2
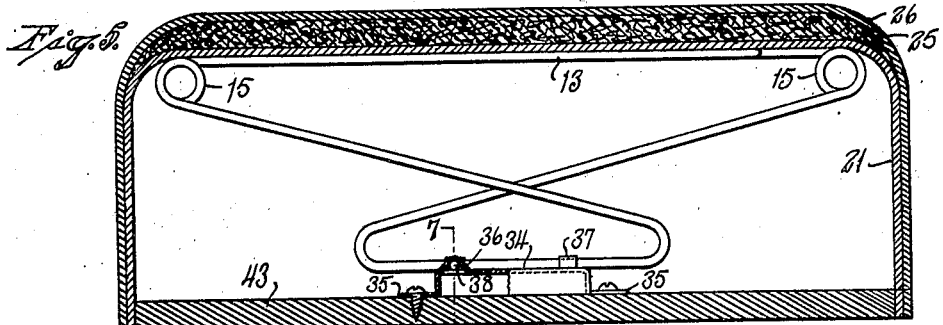
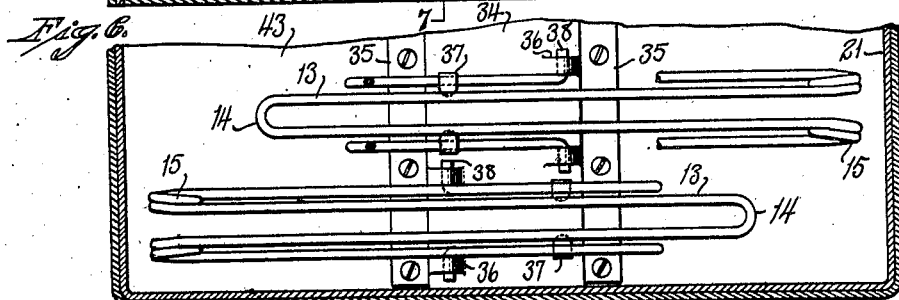
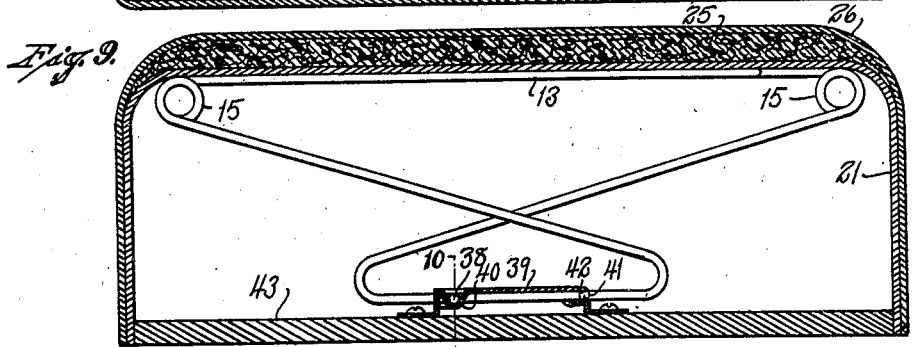
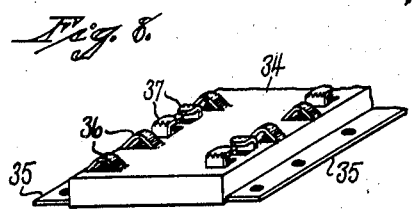
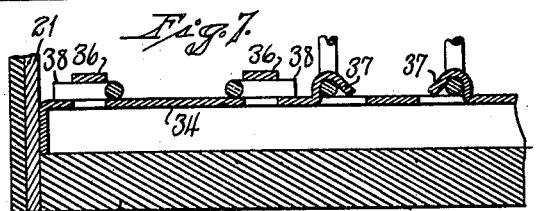
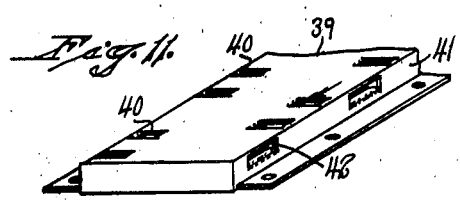
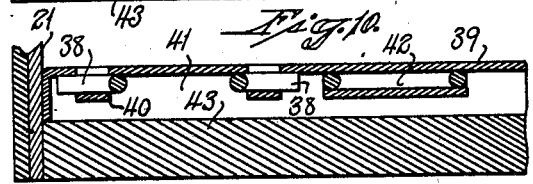

Patented July 23, 1935

2,008,670

UNITED STATES PATENT OFFICE 2,008,670

SPRING CUSHION

John R. Lee, Wallingford, Conn., assignor to Cantilever Seat Company, Incorporated, Wallingford, Conn., a corporation Application August 12, 1933, Serial No. 684,789

2 Claims. (Cl. 155—179)

This invention relates to an improvement in spring-cushions, particularly cushions for railroad car seats, automobiles, davenports, or other kinds of furniture.

In cushions of this character, springs have been arranged to extend from the front to the back, to provide the resiliency and to support the upholstery. In the use of such springs, they are liable to separate laterally, so that the cushions soon become uneven, and one object of this invention is to so anchor the springs that lateral movement is avoided while longitudinal motion is provided for.

Another object of the invention is to provide means for supporting the upholstery at the sides of the cushion.

These and other features of the invention will be readily understood by reference to the following description, taken in connection with the accompanying drawings, in which:

Fig. 1 is a sectional side view of a spring-cushion constructed in accordance with my invention;

Fig. 2 is a sectional view on the line 2—2 of Fig. 1;

Fig. 3 is a sectional view on the line 3—3 of Fig. 1;

Fig. 4 is a perspective view of one of the end-supports, detached;

Fig. 5 is a sectional side view illustrating a modified means for securing the springs to the frame;

Fig. 6 is a broken plan view with the covering removed;

Fig. 7 is a sectional view on the line 7—7 of Fig. 5;

Fig. 8 is a broken perspective view of the spring-anchoring plate, detached;

Fig. 9 is a sectional side view illustrating another modified means for securing the springs;

Fig. 10 is a sectional view on the line 10—10 of Fig. 9; and

Fig. 11 is a broken perspective view of a modified form of anchoring-plate.

In carrying out my invention, I employ a substantially-rectangular frame-section 43, to the front edge 32 and rear edge 33 of which spring-members are attached. Each of these spring-members presents a substantially U-shaped form when viewed either from the top or side, and consists of a pair of complementary upwardly-bowed parallel upper-reaches 13, connected together at their ends by integral cross-reaches 14 and each merging at its other end into a loop or helical coil 15 which has capacity for bodily vertical movement, and for that reason, may be characterized as "floating" loops.

In the preferred construction, these springs are reversely arranged, that is some, and preferably half of them have their ends secured to the front of the frame and extend upwardly to the rear, while the others have their ends secured to the rear of the frame and extend upwardly to the front, so that some of the coils are at the front and intermediate coils at the back, and these positions are preferably alternated.

Preferably, the free ends or lower reaches 44 of some of the springs will be secured to the front 16 of the frame by plates 17 overlying the ends of the springs and secured to the front strip by bolts 18. The lower reaches of alternate springs are secured to the rear strip 19 by similar plates 20.

Instead of securing the ends of the springs by plates 17, as above described, I may employ an anchoring-plate 34 adapted to be firmly secured to the seat-frame, preferably by providing the anchor with flanges 35 which may be screwed to the frame. This anchoring-strip is formed on opposite sides with alternately-arranged pairs of loops 36 and hooks 37 which are struck upward from the upper face of the anchoring-plate. The free ends of the springs will be turned outward at right angles, forming fingers 38 to be engaged by the loops 36, whereas on the opposite side of the center, the ends of the springs will be held down by the hooks 37. In other words, in mounting the springs, the free ends are pressed together so as to permit them to slide beneath the hooks 37 and move toward the loops 36 and when in line therewith, are allowed to expand, so that the ends 38 will be engaged and held by the loops 36. Or, instead of forming the anchoring-plate with upwardly-extending loops and hooks, the anchoring-plate 39, as shown in Fig. 11, may have loops 40 struck downward and the side-walls 41 formed with slots 42, so that the ends of the springs 38, when crowded together, may be passed through the slots 42 and expanded into the loops 40. The springs are thus firmly anchored to the seat-frame.

An inner textile covering 21 is secured to the frame and encloses all of the spring-members mounted thereon, and may also extend under the frame so as to close the same against the ingress of dust, etc.

Secured to the under side of the covering 21 is a strip 22 of canvas or other suitable material, the strips extending from one side to the other and preferably extending downward, the ends secured to the under face of the frame. This strip is secured to the inner covering 21 at intervals by stitches 23 forming a series of loops 24 through which the upper-reaches 13 of the springs extend, and so that the said springs are held against lateral movement while permitting longitudinal movement, the latter being essential to the correct functioning of a cantilever spring to prevent rebound.

A pad or cushion 25 is placed over the top of the inner covering and this may be held in place by an outer covering 26 of any desired material, this outer covering also extending down beneath the frame to which it is secured.

To support the sides of the cushion and prevent breaking down, I employ two reversely-arranged U-shaped springs 27 having their ends 28 secured to the front and rear portions of the frame near the center thereof, and these springs correspond substantially in width to the seat and extend upward transversely to the other spring-members, to the sides of the seat so as to support the side-edges thereof.

To provide for changing the fulcrum point of the springs, I employ two cam-strips 29 secured to the sides of the frame by bolts 30 which extend through slots 31 in the sides of the frame, so that the cam-strips 29 may be adjustably connected with the frame beneath the lower-reaches of the springs, and may be moved toward or away from each other to increase or decrease the tension of the springs. By thus anchoring, so to speak, the springs, they are held against separating sidewise, and consequently prevent the cushion from sagging under the weight imposed thereon, and by providing the cam-strips, the tension of the springs may be adjusted for the particular purpose for which the cushion is to be used and the said springs support the side edges of the cushion so that it will not break down at those points.

The loops, while preventing sidewise movement of the springs, permits them to move longitudinally under pressure and against friction with the walls of the pockets, producing a snubbing or checking of the rebound.

I claim:

1. In a spring-cushion, the combination with a supporting-frame, of a plurality of spring-members secured to said frame, each comprising two upper and two lower reaches, the ends of the upper reaches connected together, some of the spring-members having their ends secured to the front of the frame and extending upwardly to the rear, and others having their ends secured to the rear of the frame and extending upwardly to the front, an inner textile lining extending over and secured to said frame, textile loops connected with the said inner lining and through which the springs extend free for unlimited longitudinal movement, and fulcrum-bars adjustably connected with the frame and extending transversely beneath and in contact with the lower-reaches of said springs.

2. In a spring-cushion, the combination with a supporting-frame, of a plurality of spring-members each comprising upper and lower reaches connected together and secured to said frame and some of the spring-members having their ends secured to the front of the frame and extending upwardly to the rear, and others having their ends secured to the rear of the frame and extending upwardly to the front, an inner lining extending over said frame and secured thereto, loops connected with the said inner lining and through which the springs freely extend, and fulcrum-bars adjustably connected with the frame and extending transversely beneath and in contact with the lower-reaches of said springs.

JOHN R. LEE.